United States Patent
Kanazawa et al.

(10) Patent No.: US 11,499,950 B2
(45) Date of Patent: Nov. 15, 2022

(54) PEAK DETECTION METHOD AND DATA PROCESSING DEVICE

(71) Applicant: SHIMADZU CORPORATION, Kyoto (JP)

(72) Inventors: Shinji Kanazawa, Kyoto (JP); Hiroaki Kozawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 808 days.

(21) Appl. No.: 15/780,921

(22) PCT Filed: Dec. 3, 2015

(86) PCT No.: PCT/JP2015/084043
§ 371 (c)(1),
(2) Date: Nov. 7, 2018

(87) PCT Pub. No.: WO2017/094170
PCT Pub. Date: Jun. 8, 2017

(65) Prior Publication Data
US 2019/0064130 A1 Feb. 28, 2019

(51) Int. Cl.
*G01N 30/86* (2006.01)
(52) U.S. Cl.
CPC ..... *G01N 30/8637* (2013.01); *G01N 30/8641* (2013.01)
(58) Field of Classification Search
CPC ............ G01N 30/8637; G01N 30/8641
See application file for complete search history.

(56) References Cited

U.S. PATENT DOCUMENTS

2010/0100336 A1* 4/2010 Wright ............... G01N 30/8624
702/32
2010/0280811 A1* 11/2010 Gorenstein ........ G01N 30/8624
703/12
(Continued)

FOREIGN PATENT DOCUMENTS

JP 7-098270 A 4/1995
JP 2009-513985 A 4/2009
(Continued)

OTHER PUBLICATIONS

The Japanese Pharmacopoeia, Sixteenth Edition Ministry of Health, Labour and Welfare, chapter 2 Physical methods Chromatography, Mar. 24, 2011, pp. 59-62 (Year: 2011).*
(Continued)

*Primary Examiner* — Yoshihisa Ishizuka
(74) *Attorney, Agent, or Firm* — Sughrue Mion, PLLC

(57) ABSTRACT

A method for detecting a peak in data of a chromatogram or a spectrum, includes: detecting multiple tentative peaks in the data on the basis of a predetermined criterion; determining an actual measurement value of a predetermined feature value indicating a size of a tentative peak from each of the detected multiple tentative peaks, the feature value; determining a smoothed curve on the basis of respective horizontal axis values and actual measurement values of the multiple tentative peaks; determining a reference value of the feature value with respect to each of the multiple tentative peaks from the smoothed curve; and detecting, of the multiple tentative peaks, a tentative peak whose actual measurement value is within a predetermined range from the corresponding reference value as a true peak. Only tentative peaks whose actual measurement value is within a predetermined range from the corresponding reference value as a true peak.

5 Claims, 6 Drawing Sheets

(56) References Cited

U.S. PATENT DOCUMENTS

| | | | | |
|---|---|---|---|---|
| 2010/0292957 A1* | 11/2010 | Satulovsky | ........ | G06K 9/00503 702/179 |
| 2011/0054804 A1* | 3/2011 | Pfaff | ...................... | G01N 30/02 250/282 |
| 2013/0080073 A1* | 3/2013 | de Corral | ............ | H01J 49/0036 702/23 |
| 2014/0012515 A1* | 1/2014 | Taneda | ................ | G01N 30/8624 702/32 |
| 2015/0206728 A1* | 7/2015 | Kaneko | ............... | H01J 49/0009 250/281 |
| 2016/0216239 A1 | 7/2016 | Aota et al. | | |

FOREIGN PATENT DOCUMENTS

| | | |
|---|---|---|
| JP | 2014-119401 A | 6/2014 |
| WO | 2007/051117 A2 | 5/2007 |

OTHER PUBLICATIONS

Communication dated Dec. 11, 2018 from the Japanese Patent Office in counterpart Application No. 2017-553576.

2.01 Liquid Chromatography 8. Terminology SN Ratio, The Japanese Pharmacopoeia, Sixteenth Edition, [retrieval date Feb. 22, 2016], Ministry of Health, Labour and Welfare [online], Mar. 24, 2011, p. 39, Internet<URL:http://jpdb.nihs.go.jp/jp16/YAK-KYOKUHOU16.pdf>, 5 pages.

Greg Wells, et al., "Shitsuryo Bunseki ni Okeru Signal, Noise, Oyobi Kenshutsu Genkai", Technical Note, May 3, 2011, [retrieval date Feb. 22, 2016], Internet:<URL:http://www.chem-agilent.com/pdf/low_5990-7651JAJP.pdf>, 8 pages.

Ion Chromatograph Q&A sono 4 Kenshutsu Genkai, Teiryo Kagenchi no Motomekata, Dionex Technical Review, Jan. 20, 2014, [retrieval date Feb. 22, 2016], Internet:<URL:https://www.thermoscientific.jp/content/dam/tfs/Country%20Specific%20Assets/jaja/CMD/IC/Application-Notes/DG0083-JA.pdf>, 5 pages.

Written Opinion for PCT/JP2015/084043 dated Mar. 8, 2016 [PCT/ISA/237].

Communication dated Oct. 18, 2019, from The State Intellectual Property Office of the P.R. of China in counterpart Application No. 201580085784.5.

2.01 Liquid Chromatography 8. Terminology SN Ratio, The Japanese Pharmacopoeia, Sixteenth Edition, [retrieval date Feb. 22, 2016], Ministry of Health, Labour and Welfare [online], Mar. 24, 2011, p. 37-39, (6 pages total)Internet<URL:http://jpdb.nihs.go.jp/jp16/YAKKYOKUHOU16.pdf>.

Ion Chromatograph Q&A sono 4 Kenshutsu Genkai, Teiryo Kagenchi no Motomekata, Dionex Technical Review, Jan. 20, 2014, [retrieval date Feb. 22, 2016], Internet:<URL: https://www.thermoscientific.jp/content/dam/tfs/Country%20Specific%20Assets/jaja/CMD/IC/Application-Notes/DG0083-JA.pdf>, 10 pages.

\* cited by examiner

Fig. 3
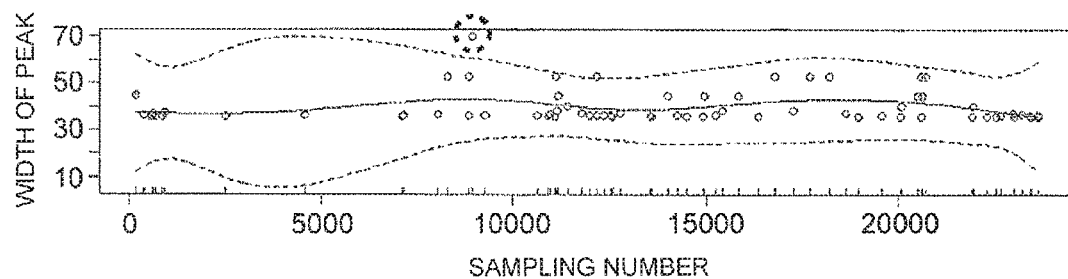
Fig. 4(a) BEFORE SUBTRACTION OF FALSE PEAK 25
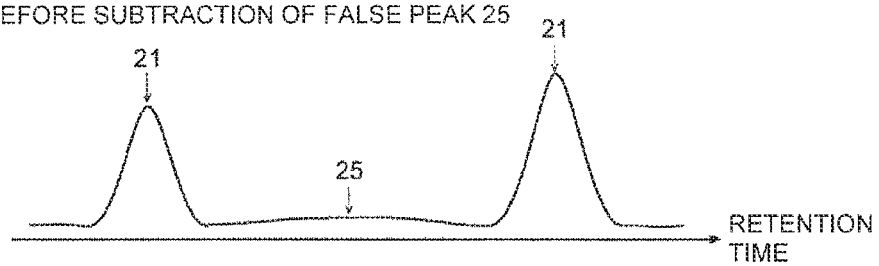
Fig. 4(b) AFTER SUBTRACTION OF FALSE PEAK 25
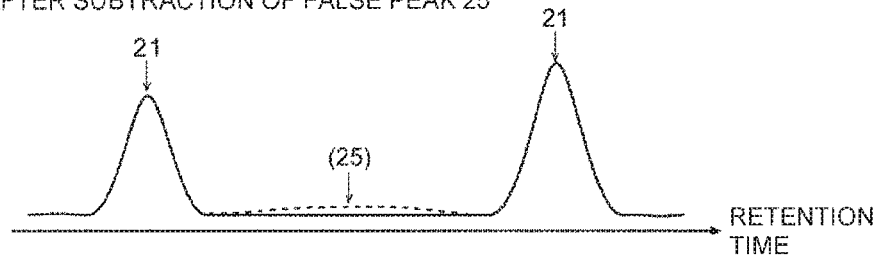

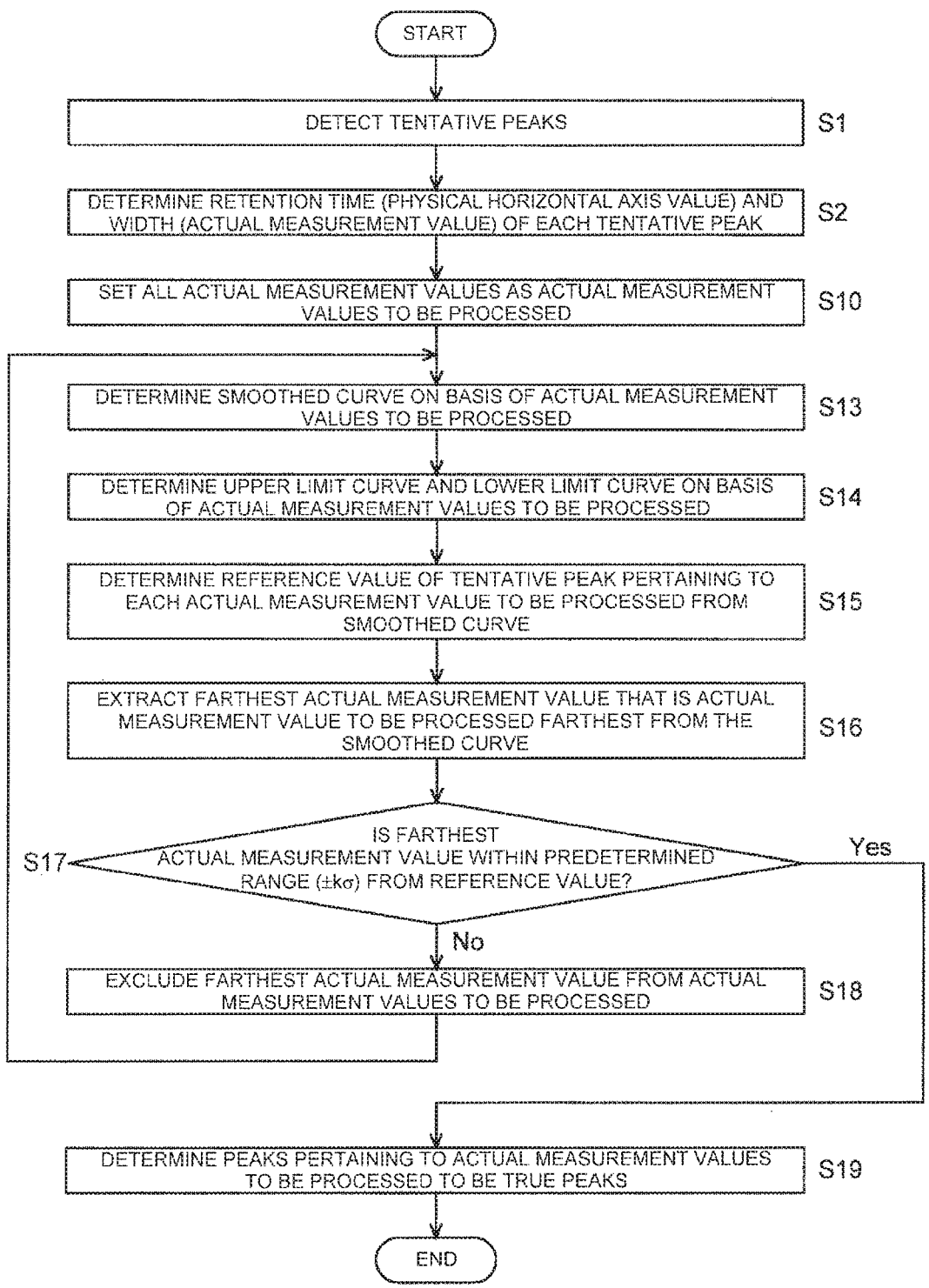

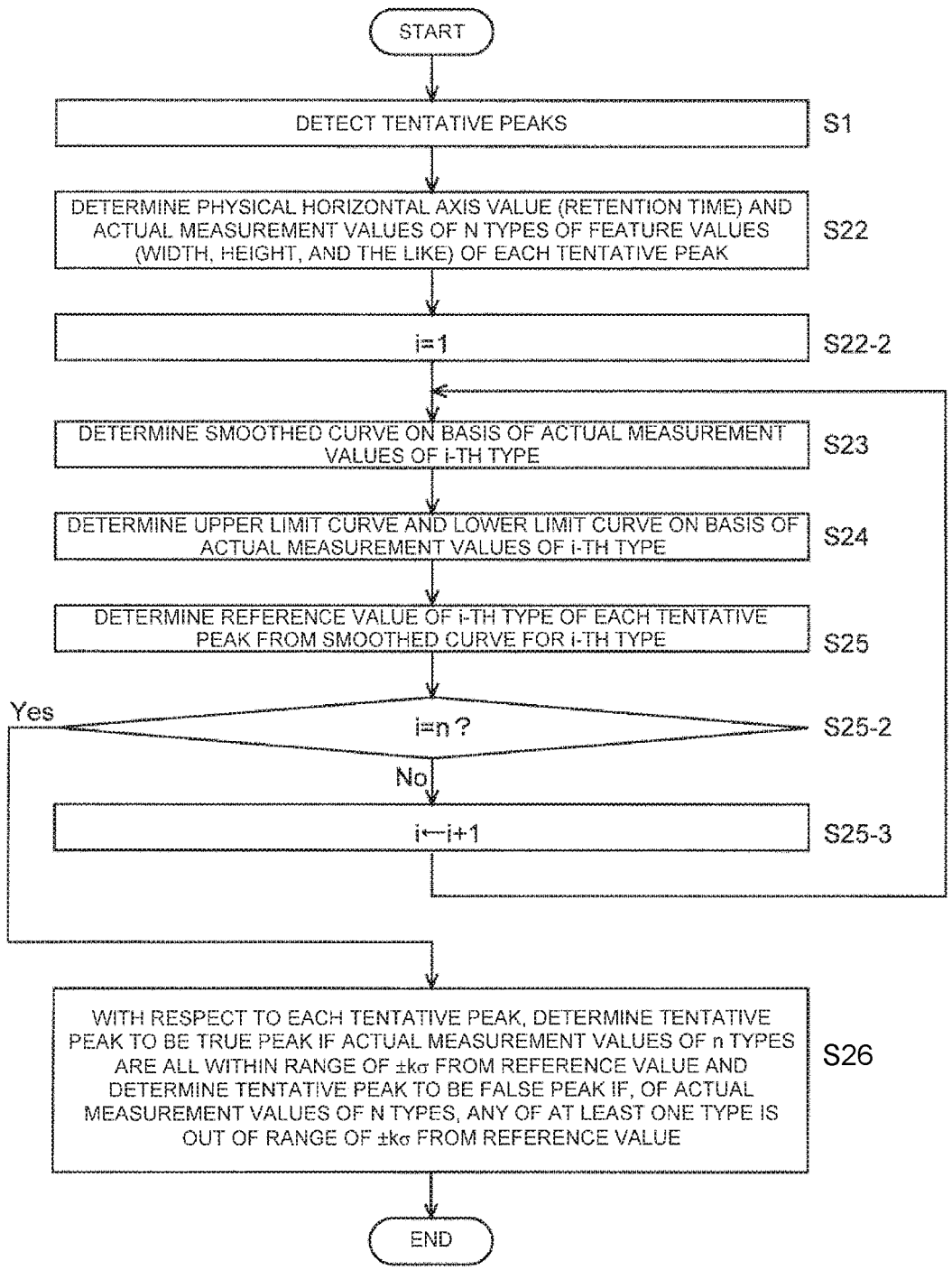

PEAK DETECTION METHOD AND DATA PROCESSING DEVICE

CROSS REFERENCE TO RELATED APPLICATIONS

This application is a National Stage of International Application No. PCT/JP2015/084043, filed on Dec. 3, 2015.

TECHNICAL FIELD

The present invention relates to a method of detecting peaks in, for example, a chromatogram obtained by a chromatograph or a spectrum obtained by a mass spectrometer, a spectral device or the like, and a data processing apparatus that implements the method.

BACKGROUND ART

A chromatograph is one of devices that analyze components contained in a sample. In the chromatograph, a sample is introduced into a column with the flow of a mobile phase, and components in the sample are temporally separated in the column, and after that, a detector detects the components, and a chromatogram is created. Then, each of the components is identified on the basis of a peak position on the chromatogram, and the concentration of the component is determined on the basis of the height or the area of a peak (for example, Patent Literature 1).

In a chromatogram, peaks derived from a sample stand on a baseline which exists regardless of the presence or absence of the peaks, and, in general, a noise derived from electric power and the like used in the chromatograph device is also added on the peaks. To obtain accurate information of the sample from the chromatogram, it is necessary to remove the baseline and eliminate the noise when detecting the peaks. As for eliminating noise, various methods, such as one using the Fourier transform, are known. In the following, an example of a method of removing a baseline from a chromatogram is described with reference to FIGS. 8(*a*) to 8(*c*).

First, an operation to eliminate a noise from a chromatogram is performed (in a case where the noise is negligible, this operation may be omitted). Next, a peak top 91 in the chromatogram with the noise eliminated is detected (FIG. 8(*a*)). The peak top 91 is, for example, a position where a height of the chromatogram is equal to or more than a predetermined value and the value of the first derivative is 0. Alternatively, the operator may visually determine the peak top 91 and identify this position 91 using an input device such as a mouse. Then, a peak start point 92 is detected at a shorter retention time than the peak top 91, and a peak end point 93 is detected at a longer retention time than the peak top 91 (FIG. 8(*a*)). The start point 92 is, for example, a position where the second derivative is positive and the first derivative is equal to or more than a positive predetermined value, or, alternatively, a position where the operator visually determines and identifies through the input device. Likewise, the end point 93 is a position where the second derivative is positive and the first derivative is equal to or less than a negative predetermined value (the absolute value is equal to or more than the predetermined value), or a position where the operator visually determines and identifies through the input device.

Based on the peak start and end points 92 and 93 found in this way, the baseline is determined, for example, as follows. First, the portion of the chromatogram corresponding to the period of retention time when no peak exists, such as between peaks and both ends of the chromatogram, is determined as a partial baseline 941 (FIG. 8(*b*)). In a peak portion, a part where the start point 92 and the end point 93 are connected with a straight line is determined as a partial baseline 942 (FIG. 8(*b*)). The total of the partial baselines 941 and 942 obtained in this way is the baseline 94 of the entire chromatogram. By subtracting this baseline 94 from the chromatogram, peaks of the chromatogram corresponding to components of a sample are determined (FIG. 8(*c*)). Then, for each peak thus determined, feature values such as a position, a width, and a height are found.

CITATION LIST

Patent Literature

Patent Literature 1: JP 07-098270 A

SUMMARY OF INVENTION

Technical Problem

In detecting peak tops during the above-described process of removing a baseline, a peak may be incorrectly detected at a retention time when no peaks derived from a sample exist due to the following causes. For example, in a case where noise has not been completely eliminated before the baseline is removed, a peak of the noise that is not a true peak may be incorrectly detected as a peak derived from the sample. Furthermore, if degradation of a column or a mobile phase and the like cause a drift in the baseline, a portion of the baseline that is not a true peak may be incorrectly detected as a peak.

The description so far was about chromatogram however, there arises a similar problem of incorrectly detecting a peak not originating from a sample in a mass spectrum obtained by a mass spectrometer used in combination with a chromatograph, a spectrum of light obtained by a spectral device, etc.

The problem to be solved by the present invention is to provide a peak detection method capable of detecting a true peak correctly and a data processing apparatus that implements the method.

Solution to Problem

The first aspect of the present invention developed for solving the previously described problem is a peak detection method for detecting a peak in data of a chromatogram or a spectrum, the peak detection method including:

a) a tentative-peak detecting step of detecting multiple tentative peaks in the data on a basis of a predetermined criterion;

b) an actual-measurement-value determining step of determining an actual measurement value of a predetermined feature value indicating a size of a tentative peak from each of the detected multiple tentative peaks;

c) a smoothing processing step of determining a smoothed curve on a basis of respective horizontal axis values and the actual measurement values of the multiple tentative peaks:

d) a reference-value determining step of determining a reference value of the feature value with respect to each of the multiple tentative peaks from the smoothed curve; and e) a true-peak detecting step of determining, among the multiple tentative peaks, a tentative peak whose actual measurement value is within a predetermined range from the corresponding reference value as a true peak.

As the predetermined criterion for detecting a tentative peak, for example, one can be used in that the peak top is determined as the position where the spectrum has a height of a predetermined value or more and the first derivative is 0; one can be used in that the start point is determined as the position where the second derivative is positive and the first derivative is equal to or more than a positive predetermined value; and one can be used in that the end point is determined as the position where the second derivative is positive and the first derivative is equal to or less than a negative predetermined value (the absolute value is equal to or more than the predetermined value), and the like can be used.

As the feature value, for example, a width, a height or an area (including one approximated by the product of a height by a width) of a peak can be used.

The smoothed curve is a smooth curve drawn to pass through as many data points (plot points) of the detected multiple tentative peaks as possible and pass as close the data points (plot points) as possible. Methods to determine a smoothed curve include the least square method and the smoothing spline method. The smoothing spline method is used in combination with the least square method or other methods, and, in a case of used in combination with the least square method, for example, the following process is performed. In a graph having n data points, when the value of the i-th data point is denoted by $(x_i, y_i)$, a function $h(x)$ that makes the following Equation (1) minimum is calculate by regression.

[Equation 1]

$$\sum_{i=1}^{n} \{y_i - h(x_i)\}^2 + \lambda \int \{h''(x)\}^2 dx \quad (1)$$

The function $h(x)$ is the function representing the smoothed curve. The first term of Equation (1) is the same as that of a smoothed curve using the least square method but not using the smoothing spline method, and the second term is a term added by the smoothing spline method. The second term shows smoothness (less undulation) of the function $h(x)$. In the second term, $\lambda$ is a constant called smoothing parameter. The larger the value of $\lambda$ is, the smoother (less undulation) the function $h(x)$ is.

Instead of the least square method, a technique called generalized additive model can be used. In the generalized additive model, an extension is made where, for example, each data point is added weight by a predetermined arithmetic operation. By using commercially-available statistical processing software, it becomes possible to determine a smoothed curve by the generalized additive model.

The horizontal axis corresponds to time in a chromatogram, and corresponds to wavelength, wavenumber, mass-to-charge ratio (m/z) or other physical quantities in a spectrum. Alternatively, instead of physical quantity itself, quantity derived from the physical quantity or quantity associated with the physical quantity can also be used as the horizontal axis. For example, numbers sequentially assigned to the data acquired at a regular interval, or the order numbers from the origin each assigned to every section of the horizontal axis indicating physical quantity and being divided at regular intervals can be used as the horizontal axis values.

The peak detection method according to the present invention can prevent noise, drift, or the like from being incorrectly determined as a peak and can detect a true peak correctly by calculating a reference value from a smoothed curve determined on the basis of an actual measurement value of a predetermined feature value and determining only such a tentative peak as a true peak whose actual measurement value is within a predetermined range from the corresponding reference value.

In the peak detection method according to the present invention, it is desirable to perform the following operation: first, the data of the tentative peak whose difference between the actual measurement value and the reference value is largest among the tentative peaks whose difference is out of the predetermined range is subtracted from the entire data; and then the reference-value determining step and the true-peak detecting step are repeated until no tentative peak whose difference is out of the predetermined range is detected.

Owing to this operation, the tentative peaks whose difference is out of the predetermined range is excluded one by one, and the determination of the reference value is repeatedly performed, whereby the accuracy of the reference value and the difference increases.

In the peak detection method according to the present invention, it is desirable to use two or more kinds of feature values (for example, height and width of a peak); in the actual-measurement-value determining step, the actual measurement value is determined with respect to each kind of feature value; in the smoothing processing step, the smoothed curve is determined with respect to each kind of feature value; in the reference-value determining step, the reference value is determined with respect to each kind of feature value; and in the true-peak detecting step, the tentative peak whose actual measurement values pertaining to all the kinds of feature values are within respective predetermined ranges from reference values is determined as a true peak. By using two or more kinds of feature values in this way, it becomes possible to increase the accuracy of detecting a true peak.

The determination of whether or not the actual measurement value is "within the predetermined range" from the reference value can be made on the basis of, for example, the difference between the actual measurement value and the reference value, or the ratio of the values. For example, if the difference between the actual measurement value and the reference value is smaller than $k\sigma$ which is the product of $\sigma$ by k, where $\sigma$ is a standard deviation of the data of an actual measurement value and other actual measurement values within a predetermined range (that is different from "within the predetermined range" described above) in the horizontal axis from the actual measurement value on the assumption that they are normally distributed, and k is a common constant in all the actual measurement values, the actual measurement value is determined to be "within the predetermined range" from the reference value. Alternatively, this determination can also be made on the basis of a "degree of deviation". The "degree of deviation" is an index indicating how much a statistical model is not applicable, and is represented by a value that is twice as large as a value obtained by subtracting a maximum log likelihood obtained by a statistical model used from a maximum log likelihood obtained by a statistical model called saturation model that passes through all the data points observed.

The second aspect of the present invention developed for solving the previously described problem is a data processing apparatus for detecting a peak in data of a chromatogram or a spectrum, the data processing apparatus including:

a) a tentative-peak detecting unit that detects multiple tentative peaks in the data on a basis of a predetermined criterion:

b) an actual-measurement-value determining unit that determines an actual measurement value of a predetermined feature value indicating a size of a tentative peak from each of the detected multiple tentative peaks:

c) a smoothing processing unit that determines a smoothed curve on a basis of respective horizontal axis values and actual measurement values of the multiple tentative peaks;

d) a reference-value determining unit that determines a reference value of the feature value with respect to each of the multiple tentative peaks from the smoothed curve; and e) a true-peak detecting unit that determines, among the multiple tentative peaks, a tentative peak whose actual measurement value is within a predetermined range from the corresponding reference value as a true peak.

The above-described units are realized by computer hardware, such as a central processing unit (CPU) or a memory, and software.

Advantageous Effects of the Invention

The present invention can prevent a portion that is not a true peak, which is created by a noise, a drift or the like, from being determined incorrectly and determines true peaks correctly.

BRIEF DESCRIPTION OF DRAWINGS

FIG. 3 is an example of a graph representing actual measurement values (circles), a smoothed curve (a solid curve), and upper and lower limits of a feature value of a peak (dashed curves) detected as a true peak that are found by the first embodiment of the peak detection method.

FIG. 4(a) and FIG. 4(b) are conceptual diagrams of an operation to subtract a false peak detected incorrectly as a peak in a chromatogram before detection of peaks; FIG. 4(a) and FIG. 4(b) are diagrams showing before and after subtraction of the false peak, respectively.

FIG. 6 is a flowchart showing the second embodiment of a peak detection method according to the present invention.

FIG. 7 is a flowchart showing a third embodiment of a peak detection method according to the present invention.

DESCRIPTION OF EMBODIMENTS

Embodiments of peak detection methods according to the present invention will be described with reference to FIGS. 1 to 7.

(1) First Embodiment

As described above, in a chromatogram, peaks corresponding to components of a sample are seen at different retention times, and a gradual change (a drift) is seen on a baseline along the time axis. In such a chromatogram, if peaks are detected by a conventional method, not only proper peaks derived from the components of the sample, but also the drift of the baseline and the like that are not a proper peak (hereinafter, referred to as a "false peak") may be incorrectly detected as a peak. A false peak caused by the drift is wider than the proper peaks.

Figure 1:
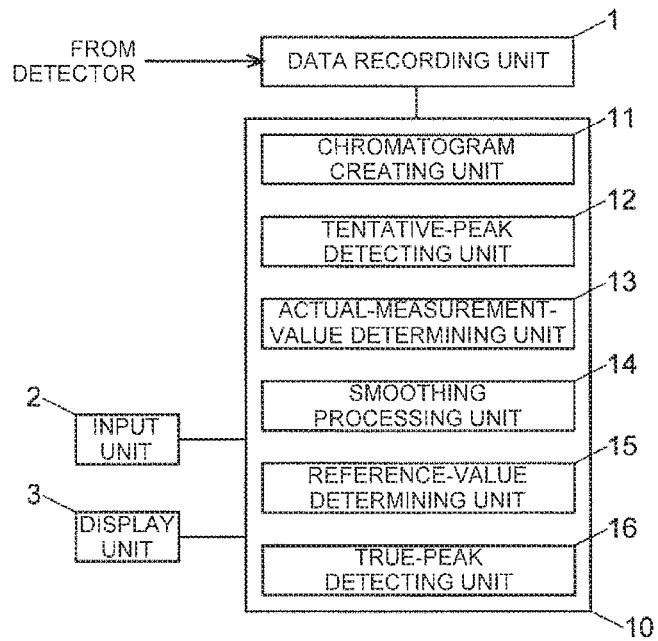
FIG. 1 is a block diagram showing a first embodiment of a data processing apparatus according to the present invention.
Figure 2:
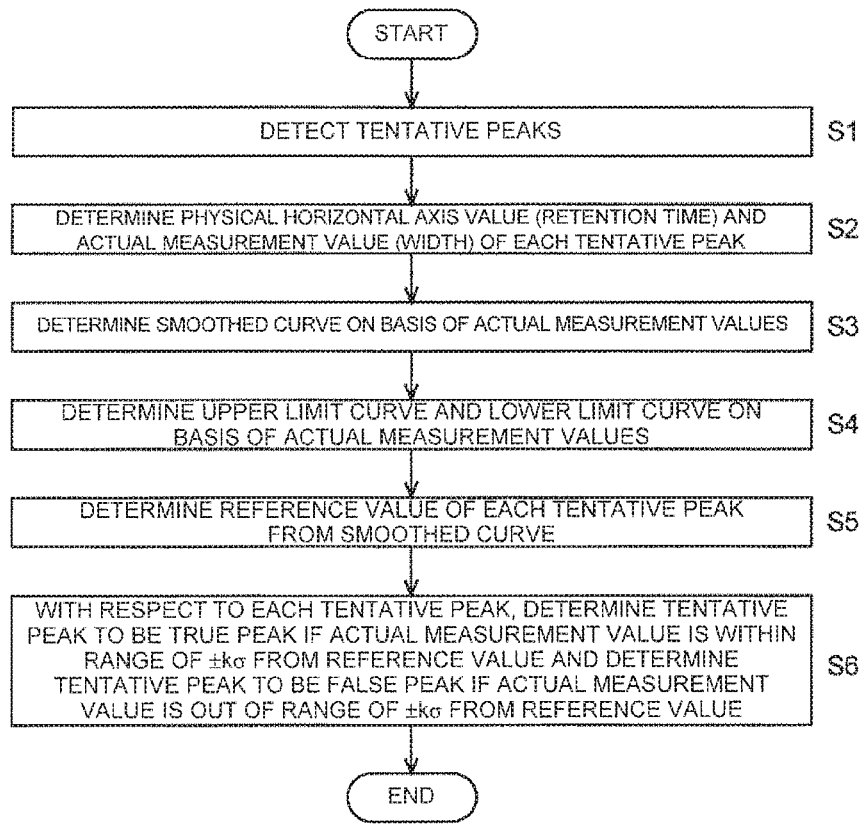
FIG. 2 is a flowchart showing the first embodiment of a peak detection method according to the present invention.

Accordingly, in a first embodiment, by using a data processing apparatus 10 shown in FIG. 1, detection of peaks in a chromatogram is performed in a procedure shown in a flowchart of FIG. 2.

The data processing apparatus 10 is an apparatus that records data obtained in a measurement by a detector included in a liquid chromatograph, a gas chromatograph, or the like in a data recording unit 1 and, after the end of the measurement, detects peaks in a chromatogram or a spectrum on the basis of the data recorded in the data recording unit 1. The data recording unit 1 is provided outside the data processing apparatus 10 in an example shown in FIG. 1; however, it may be provided in the data processing apparatus 10. The data processing apparatus 10 includes a chromatogram creating unit 11, a tentative-peak detecting unit 12, an actual-measurement-value determining unit 13, a smoothing processing unit 14, a reference-value determining unit 15, and a true-peak detecting unit 16. These units are actually realized by computer hardware, such as a CPU or a memory, and software, and their functions will be described in description of the peak detection method in the next and subsequent paragraphs. An input unit 2 composed of a keyboard, a mouse, and the like and a display unit (a display) 3 are connected to the data processing apparatus 10. Data after a peak process may be recorded in the data recording unit 1, or a recording unit different from the data recording unit 1 may be provided in the data processing apparatus 10.

The peak detection method in the first embodiment is described below with the flowchart of FIG. 2. Here, detection of peaks in a chromatogram is described as an example. Before a process of peak detection, the chromatogram creating unit 11 acquires data from the data recording unit 1, and creates a chromatogram in a manner similar to a conventional one. In a case of detecting peaks in a spectrum, this operation is unnecessary. A case of detecting peaks in a chromatogram is described below; however, the same applies to a case of detecting peaks in a spectrum.

First, using a method similar to a conventional one, the tentative-peak detecting unit 12 detects tentative peaks (including a false peak) in the chromatogram on the basis of a predetermined criterion (Step S1). This predetermined criterion is defined on the basis of a maximum value (a peak top) and a width or an area of (a curve that is considered to be) a peak. Then, the actual-measurement-value determining unit 13 determines a retention time that is a horizontal axis value (a physical horizontal axis value) and an actual measurement value of a predetermined feature value from each of the detected tentative peaks (Step S2). Here, as an example, a width of a tentative peak is obtained as an actual measurement value. By measuring the peak width as an actual measurement value in this way, it becomes easy to detect a wide false peak caused by a drift. Accordingly, actual measurement values are represented as dots (white circles in FIG. 3) on a graph of the above-described horizontal axis value as shown in FIG. 3. The horizontal axis value here is indicated by, instead of a retention time, a sampling number of data sampled at a regular interval; sampling numbers are assigned in ascending order of retention time. A width of a tentative peak (a vertical axis value) that is an actual measurement value is indicated by a difference between values of respective sampling numbers corresponding to both ends of the width.

Next, the smoothing processing unit 14 determines a smoothed curve on the basis of respective horizontal axis values and actual measurement values of these multiple tentative peaks (Step S3). In FIG. 3, the smoothed curve found by a generalized additive model using the smoothing spline method on the basis of white circles of the actual measurement values is indicated by a solid line.

Next, the reference-value determining unit 15 performs the following operations. First, the reference-value determining unit 15 determines a standard deviation σ based on the assumption that with respect to each actual measurement value, the actual measurement value and ±3 other actual measurement values within a range of the horizontal axis from the actual measurement value (incidentally, if the actual measurement value is near either end of the horizontal axis, ±3 pieces of data are created by replicating data of the corresponding end) are normally distributed, and determines respective curves separated upward and downward from the smoothed curve by kσ that is the product of σ by a constant k (Step S4). Of the curves, one above the smoothed curve is referred to as the "upper limit curve", and one below the smoothed curve is referred to as the "lower limit curve". In the present embodiment, $k=10^{1/2}$. In FIG. 3, the upper limit curve and the lower limit curve are indicated by dashed curves. Next, the reference-value determining unit 15 determines a reference value of the feature value of each tentative peak from the smoothed curve (Step S5). A value of the smoothed curve at a retention time when an actual measurement value has been obtained is used as a reference value.

Then, the true-peak detecting unit 16 determines, if an actual measurement value is within a range of ±kσ from a reference value, a peak having the actual measurement value to be a true peak, and determines, if the actual measurement value is out of the range of ±kσ from the reference value, the peak having the actual measurement value to be a false peak (Step S6). In the graph of FIG. 3, this determination is equivalent to determining whether or not a white circle indicating an actual measurement value is between the upper limit curve indicating "a reference value+kσ" and the lower limit curve indicating "the reference value−kσ". In FIG. 3, a point of an actual measurement value in a bold dashed circle deviates upward from the upper limit curve i.e., is not within the above-described range, and other actual measurement values are within the above-described range.

Through this Step S6, the peak detection method in the first embodiment ends. After that, with respect to each peak determined to be a false peak by the peak detection method, an operation to subtract a false peak 25 (a dashed line in FIG. 4(*b*)) from the chromatogram as shown in FIG. 4(*a*) can be performed on the basis of the actual measurement value of the width used in the above-described determination and another actual measurement value, such as a height or an area, of the peak. An effect of the false peak 25 caused by a drift or the like is eliminated by this operation, and a chromatogram having only true peaks 21 as peaks can be obtained. Furthermore, using a method similar to a conventional one, an operation to subtract a background other than the false peak 25 from the chromatogram after the false peak 25 has been deleted in this way can also be performed.

(2) Second Embodiment

Figure 5:
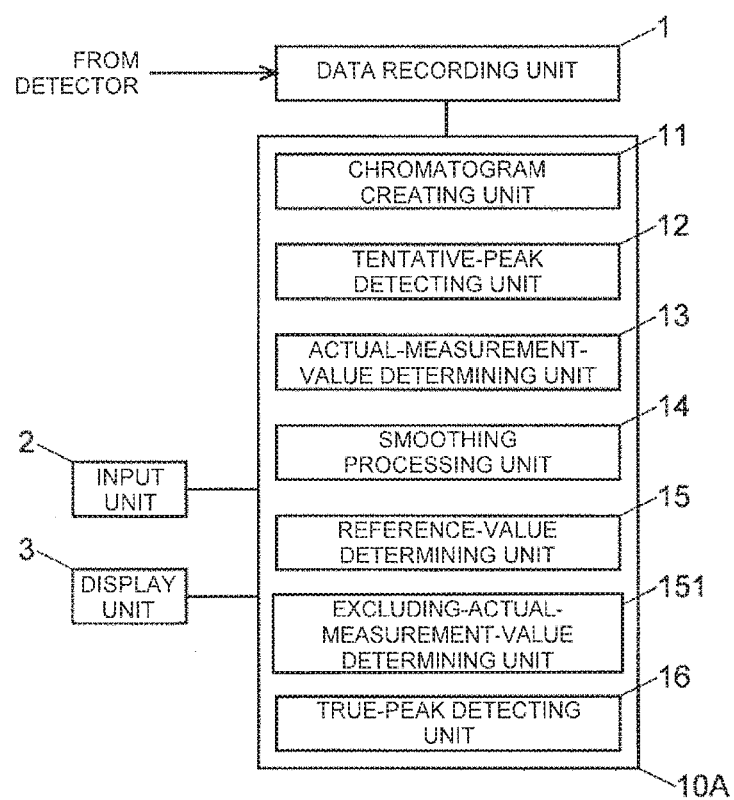
FIG. 5 is a block diagram showing a second embodiment of a data processing apparatus according to the present invention.
Figure 8A:
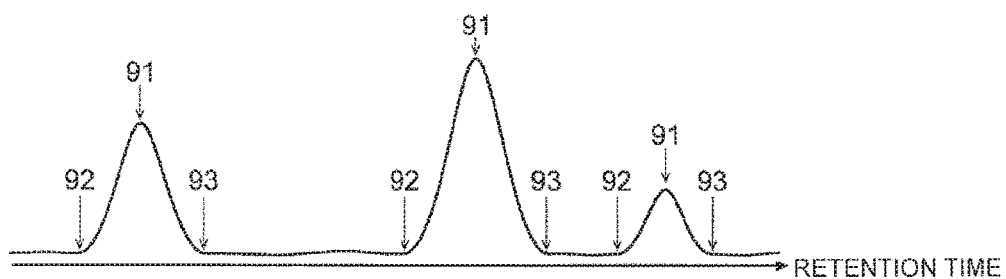
FIGS. 8(a) to 8(c) are schematic diagrams showing an example of a conventional peak detection method.
Figure 8B:
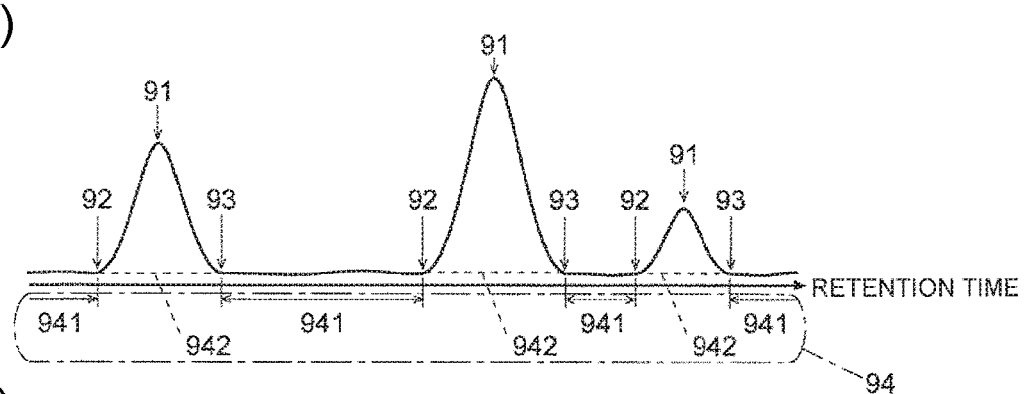
Figure 8C:
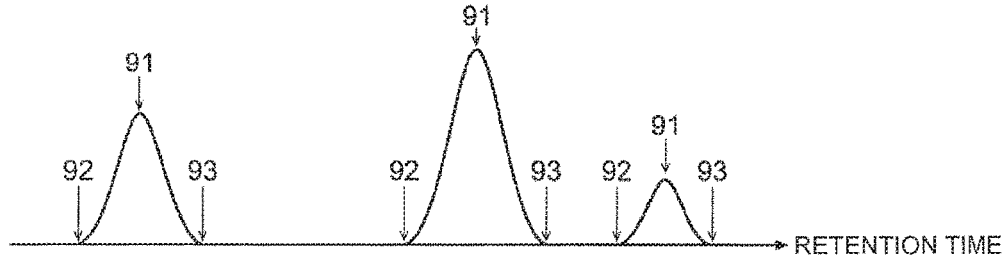

Subsequently, a second embodiment of the peak detection method and the data processing apparatus according to the present invention is described with a block diagram shown in FIG. 5 and a flowchart shown in FIG. 6. A data processing apparatus 10A in the second embodiment includes an excluding-actual-measurement-value determining unit 151, and the other configurations are the same as the data processing apparatus 10 in the first embodiment. The excluding-actual-measurement-value determining unit 151 is realized by computer hardware and software, just like the units of the data processing apparatus 10 in the first embodiment. The function of the excluding-actual-measurement-value determining unit 151 will be described in description of the peak detection method.

In the peak detection method in the second embodiment, the operations up to Step S2, where the tentative-peak detecting unit 12 detects tentative peaks in a chromatogram (Step S1) and the actual-measurement-value determining unit 13 determines a horizontal axis value and an actual measurement value of a feature value with respect to each of the detected tentative peaks (Step S2), are the same as those of the peak detection method in the first embodiment.

After Step S2, Steps S10 and S13 are performed in this order. For the convenience of description, Step S13 is described first. At Step S13, using remaining actual measurement values (hereinafter, referred to "actual measurement value(s) to be processed") except for an actual measurement value excluded through an exclusion operation to be described later, the smoothing processing unit 14 determines a smoothed curve by the same method as Step S3 in the first embodiment. At this stage, the exclusion operation has not yet been performed, and therefore all actual measurement values are set as actual measurement values to be processed at Step S10.

Then, at Step S14, with respect to each of the actual measurement values to be processed, the reference-value determining unit 15 determines a standard deviation σ by a method similar to Step S4 in the first embodiment, and determines an upper limit curve and a lower limit curve on the basis of the standard deviation and the smoothed curve found at Step S13. Next, a reference value pertaining to each actual measurement value to be processed, i.e., a value of the smoothed curve at a retention time when the actual measurement value to be processed has been obtained is found from the smoothed curve (Step S15).

Then, the excluding-actual-measurement-value determining unit 151 obtains a difference between each actual measurement value to be processed and its corresponding reference value, and extracts an actual measurement value having a maximum absolute value of the difference, i.e., an actual measurement value to be processed farthest from the smoothed curve (hereinafter, referred to as a "farthest actual measurement value") (Step S16). Furthermore, the excluding-actual-measurement-value determining unit 151 determines whether or not the farthest actual measurement value is within a range of ±kσ (a predetermined range) from the reference value (Step S17). If the farthest actual measurement value has been determined to be out of the range of ±kσ from the reference value (i.e., No) at Step S17, the farthest actual measurement value is excluded at Step S18 (an exclusion operation), and the operations at Steps S13 to S17 are repeated with the remaining actual measurement values as an actual measurement value to be processed.

On the other hand, if the farthest actual measurement value has been determined to be within the range of ±kσ from the reference value (i.e., YES) at Step S17, the true-peak detecting unit 16 determines peaks pertaining to all the actual measurement values to be processed at the time to be true peaks (Step S19), and a series of operations end.

According to the peak detection method in the second embodiment, through repetition of the operation to recreate a smoothed curve by excluding one actual measurement value out of the range of ±kσ from a reference value, the accuracy of the smoothed curve is increased, and therefore the accuracy of excluding a false peak is also increased.

(3) Third Embodiment

Subsequently, a third embodiment of the peak detection method and the data processing apparatus according to the present invention is described with a flowchart shown in FIG. 7. In the third embodiment, multiple types (in this case, n types (n is a natural number equal to or more than 2)) of feature values such as a width and a height of a peak in a chromatogram) are used. A data processing apparatus in the third embodiment is represented by the same block diagram (FIG. 1) as the data processing apparatus 10 in the first embodiment.

First, the tentative-peak detecting unit 12 detects tentative peaks in a chromatogram, just like the peak detection method in the first embodiment (Step S1). Then, the actual-measurement-value determining unit 13 determines a horizontal axis value (in this case, a retention time) and actual measurement values of n types of feature values with respect to each of the detected tentative peaks (Step S22).

Next, at Step S22-2, "1" is set as an initial value of a parameter i (=any natural number from 1 to n) to be described below. At subsequent Steps S23 to S25, a process on, of the n types of feature values, the i-th type of feature value is performed by a method similar to Steps S3 to S5 in the first embodiment. First, at Step S23, the smoothing processing unit 14 determines a smoothed curve on the basis of actual measurement values of the i-th type of feature value. Next, at Step S24, the reference-value determining unit 15 determines an upper limit curve and a lower limit curve on the basis of the actual measurement values of the i-th type of feature value. Then, at Step S25, a reference value of the i-th type of feature value of each tentative peak is found from the smoothed curve for the i-th type.

After the processes at Steps S23 to S25 with respect to the i-th type of feature value are performed in this way, if these processes with respect to the n-th type have not been completed (No at Step S25-2), the value of i is incremented by 1 (Step S25-3), and the operations at Steps S23 to S25 with respect to the next type of feature values actual measurement values are performed. On the other hand, if the processes at Steps S23 to S25 with respect to the n-th type have been completed (Yes at Step S25-2), proceed to Step S26. At this point of time, graphs of the actual measurement values, the smoothed curve, the upper limit curve, and the lower limit curve that correspond to FIG. 3 can be can be created with respect to each of the n types of feature values.

At Step S26, the true-peak detecting unit 16 determines, if the actual measurement values pertaining to the n types of feature values of each tentative peak are all within the range of ±kσ from respective reference values found for the feature values, the tentative peak to be a true peak. On the other hand, the true-peak detecting unit 16 determines, if, of actual measurement values of the n types of feature values of each tentative peak, any of at least one type is out of the range of ±kσ from a reference value found for the feature value, the tentative peak to be a false peak. Through this Step S26, the peak detection method in the third embodiment ends.

In the peak detection method in the third embodiment, multiple types of feature values are used to perform detection of true peaks, and therefore the accuracy is further increased.

The above-described embodiments are merely examples of the present invention, and any modification, alteration, or addition made appropriately within the scope of the gist of the invention will naturally encompassed by claims in the application concerned. For example, in the above-described embodiments, detection of peaks in a chromatogram is performed; instead, detection of peaks in a spectrum may be performed. In detection of peaks in a spectrum, physical quantity, such as a wavelength, a wavenumber, or m/z, on the horizontal axis of the spectrum can be used as a horizontal axis value. Furthermore, a value other than physical quantity can also be used as a horizontal axis value; for example, the horizontal axis of the spectrum is divided at equally spaced intervals, and numbers assigned to divided sections of the horizontal axis in order from the origin can be used.

REFERENCE SIGNS LIST

1 . . . Data Recording Unit
2 . . . Input Unit
3 . . . Display Unit
10, 10A . . . Data Processing Apparatus
11 . . . Chromatogram Creating Unit
12 . . . Tentative-Peak Detecting Unit
13 . . . Actual-Measurement-Value Determining Unit
14 . . . Smoothing Processing Unit
15 . . . Reference-Value Determining Unit
151 . . . Excluding-Actual-Measurement-Value Determining Unit
16 . . . True-Peak Detecting Unit
21 . . . True Peak
25 . . . False Peak
91 . . . Peak Top
92 . . . Peak Start Point
93 . . . Peak End Point

The invention claimed is:

1. A method for analyzing data of a chromatogram or a spectrum, the method comprising:
a data-acquiring step of acquiring, by a chromatograph, a mass spectrometer or an optical spectrometer, data of a sample to be analyzed;
a data shaping step of creating a chromatogram or a spectrum based on the data;
a tentative-peak detecting step of detecting multiple tentative peaks in the chromatogram or the spectrum on a basis of a predetermined criterion;
an actual-measurement-value determining step of measuring, as actual measurement values, a peak width of each of the multiple tentative peaks in the chromatogram or the spectrum;
a smoothed curve creating step of plotting a smooth curve by using a least square method or a smoothing spline method to a data set of horizontal axis values which correspond to a retention time, m/z, a wavelength, a wavenumber or a sampling number of data sampled at a regular interval and the actual measurement values as vertical axis values of each of the horizontal axis values;
a reference-value determining step of determining reference values to correspond to the vertical axis values on the smooth curve, where each of the reference values is a value for excluding a false peak; and a true-peak detecting step of determining, among the multiple tentative peaks, a tentative peak whose actual measurement value is within a predetermined range from a corresponding reference value as a true peak; and a displaying step of displaying, by a display, the true peak.

2. The method according to claim 1, wherein:

in the actual-measurement-value determining step, an actual measurement value is further determined with respect to each of the one or more kinds of feature values other than the peak width;

in the smoothed curve creating step, a smooth curve is further plotted with respect to each of the one or more kinds of feature values;

in the reference-value determining step, a reference value is further determined with respect to each of the one or more kinds of feature values; and in the true-peak detecting step, a tentative peak whose actual measurement values of the one or more kinds of feature values are within respective predetermined ranges from reference values of the one or more kinds of feature values is further determined as a true peak.

3. The method according to claim 1, wherein in the true-peak detecting step, determination of whether or not the actual measurement value is within the predetermined range from the reference value is performed by determining whether or not a difference between the actual measurement value and the reference value is smaller than $k\sigma$ that is a product of $\sigma$ by k, where $\sigma$ denotes a standard deviation found based on assumption that with respect to each actual measurement value, the actual measurement value and other actual measurement values within a predetermined range of a horizontal axis value from the actual measurement value are normally distributed, and k denotes a common constant in all the actual measurement values.

4. An apparatus for analyzing data of a chromatogram or a spectrum, the apparatus comprising:

one of a chromatograph, a mass spectrometer, and an optical spectrometer configured to acquire data of a sample to be analyzed; and a data processing apparatus comprising:

a data shaping unit configured to create a chromatogram or a spectrum based on the data;

a tentative-peak detecting unit that detects multiple tentative peaks in the chromatogram or the spectrum on a basis of a predetermined criterion;

an actual-measurement-value determining unit that measures, as actual measurement values, a peak width of each of the multiple tentative peaks in the chromatogram or the spectrum;

a smoothed curve creating unit that plots a smooth curve by using a least square method or a smoothing spline method to a data set of horizontal axis values which correspond to a retention time, m/z, a wavelength, a wavenumber or a sampling number of data sampled at a regular interval and the actual measurement values as vertical axis values of each of the horizontal axis values;

a reference-value determining unit that determines reference values to correspond to the vertical axis values on the smooth curve, where each of the reference values is a value for excluding a false peak from true peak; and a true-peak detecting unit that determines, among the multiple tentative peaks, a tentative peak whose actual measurement value is within a predetermined range from a corresponding reference value as a true peak; and a display configured to display the true peak.

5. A method for analyzing data of a chromatogram or a spectrum, the method comprising:

a) a detecting data-acquiring step of acquiring, by a chromatograph, a mass spectrometer or an optical spectrometer, data of a sample to be analyzed;

b) a data shaping step of creating a chromatogram or a spectrum based on the data;

c) a tentative-peak detecting step of detecting multiple tentative peaks in the chromatogram or the spectrum on a basis of a predetermined criterion;

d) an actual-measurement-value determining step of measuring, as actual measurement values, a predetermined feature value indicating a size of a tentative peak of each of the multiple tentative peaks in the chromatogram or the spectrum;

e) a smoothed curve creating step of plotting a smooth curve by using a least square method or a smoothing spline method to a data set of horizontal axis values which correspond to a retention time, m/z, a wavelength, a wavenumber or a sampling number of data sampled at a regular interval and the actual measurement values as vertical axis values of each of the horizontal axis values;

f) a reference-value determining step of determining reference values to correspond to the vertical axis values on the smooth curve, where each of the reference values is a value for excluding a false peak from true peak; and g) a determining step of determining whether a farthest actual measurement value, which is one of the actual measurement values farthest from a certain reference value among the reference values with respect to a corresponding certain tentative peak, is within a predetermined range from the certain reference value or out of the predetermined range, and g1) if the farthest actual measurement value is within the predetermined range, determining the multiple tentative peaks as true peaks or g2) if the farthest actual measurement value is out of the predetermined range, excluding the farthest actual measurement value from the actual measurement values and repeating the steps e) to g2); and h) a displaying step of displaying, by a display, the true peaks.

* * * * *